No. 825,567. PATENTED JULY 10, 1906.
S. W. WARDWELL.
SPEED CONTROLLING DEVICE.
APPLICATION FILED JAN. 24, 1906.

5 SHEETS—SHEET 1.

WITNESSES

INVENTOR
S. W. Wardwell
BY Foster, Freeman & Watson
ATTORNEYS

No. 825,567. PATENTED JULY 10, 1906.
S. W. WARDWELL.
SPEED CONTROLLING DEVICE.
APPLICATION FILED JAN. 24, 1906.

5 SHEETS—SHEET 2.

WITNESSES

INVENTOR

ATTORNEYS

No. 825,567. PATENTED JULY 10, 1906.
S. W. WARDWELL.
SPEED CONTROLLING DEVICE.
APPLICATION FILED JAN. 24, 1906.
5 SHEETS—SHEET 3.
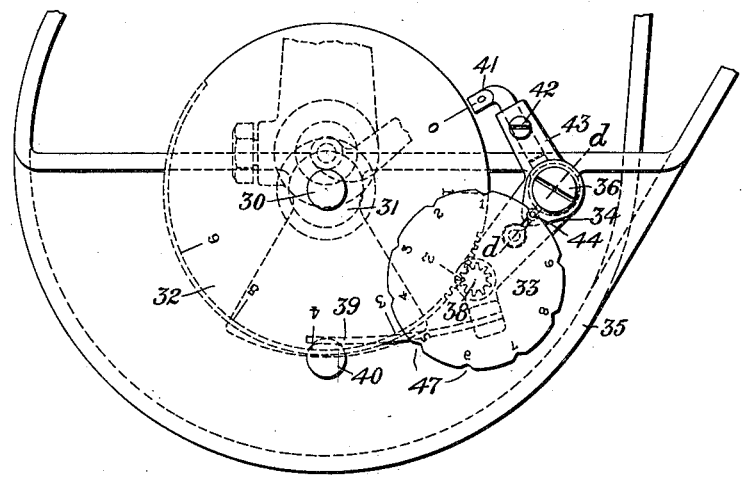
Fig. 10.
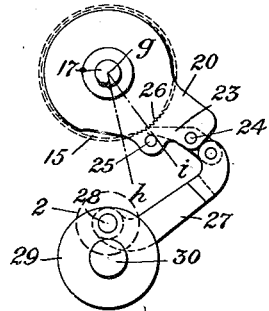
Fig. 4.
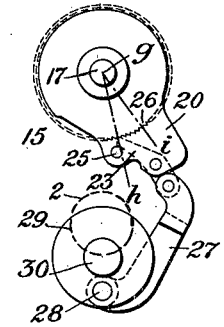
Fig. 5.
Fig. 11.
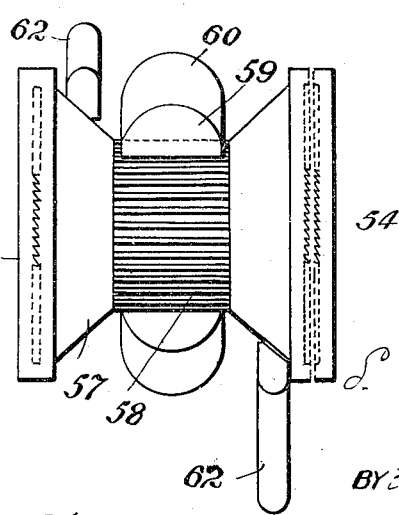
Fig. 14.
WITNESSES
R. C. Rust
Arthur L. Bryant
INVENTOR
S. W. Wardwell
BY Foster, Freeman & Watson
ATTORNEYS No. 825,567. PATENTED JULY 10, 1906.
S. W. WARDWELL.
SPEED CONTROLLING DEVICE.
APPLICATION FILED JAN. 24, 1906.

5 SHEETS—SHEET 4.

WITNESSES

INVENTOR

ATTORNEYS

No. 825,567.  
PATENTED JULY 10, 1906.  
S. W. WARDWELL.  
SPEED CONTROLLING DEVICE.  
APPLICATION FILED JAN. 24, 1906.

5 SHEETS—SHEET 5.

WITNESSES  
INVENTOR  
ATTORNEYS

UNITED STATES PATENT OFFICE.

SIMON W. WARDWELL, OF PROVIDENCE, RHODE ISLAND.

SPEED-CONTROLLING DEVICE.

No. 825,567.  Specification of Letters Patent.  Patented July 10, 1906.

Application filed January 24, 1906. Serial No. 297,693.

*To all whom it may concern:*

Be it known that I, SIMON W. WARDWELL, a citizen of the United States, residing at Providence, in the county of Providence and State of Rhode Island, have invented certain new and useful Improvements in Speed-Controlling Devices, of which the following is a specification.

My invention relates to speed-controlling devices, and is specifically designed for use with winding-machines to control the "gain," which is that slight relative peripheral advance or retreat of the package wound or of the reversing-point of the traversing guide on the surface of the package to cause succeeding coils of the material wound to lie closely adjacent.

Figure 1:
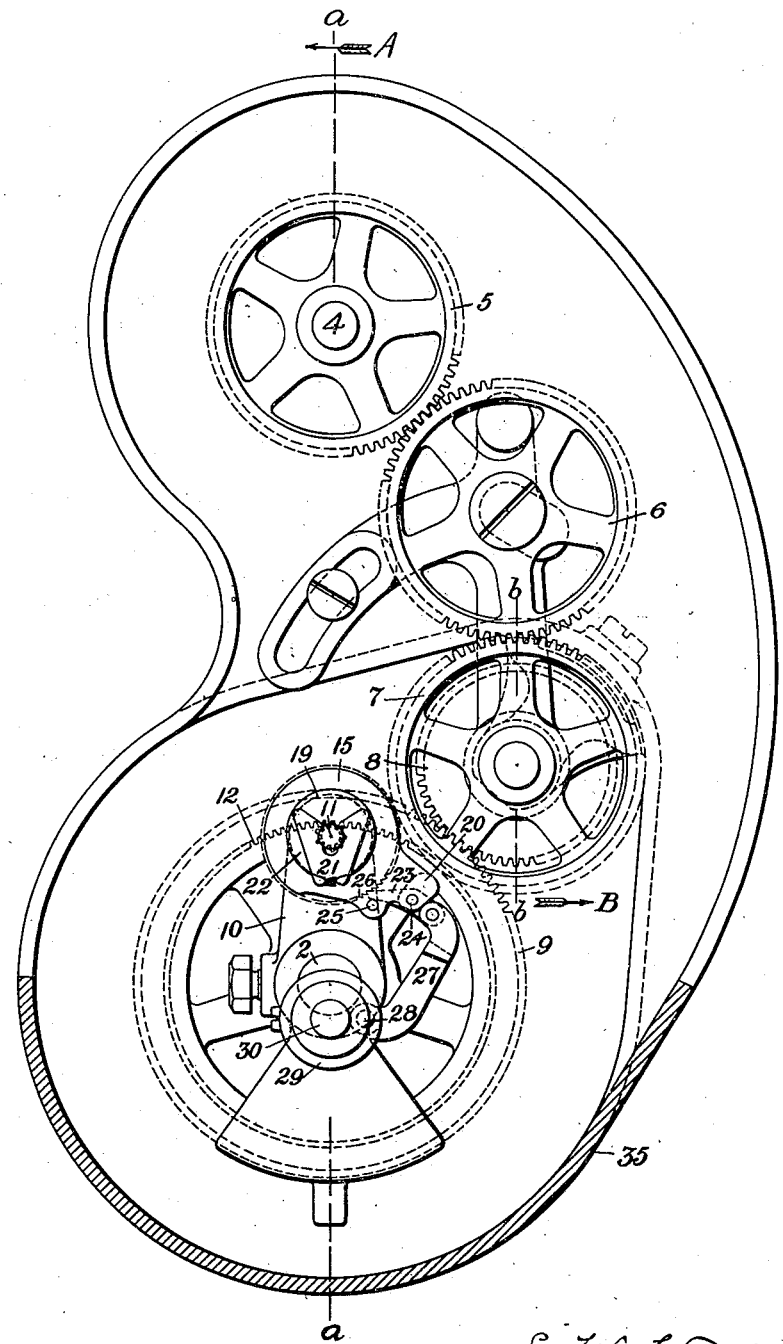
Figure 3:
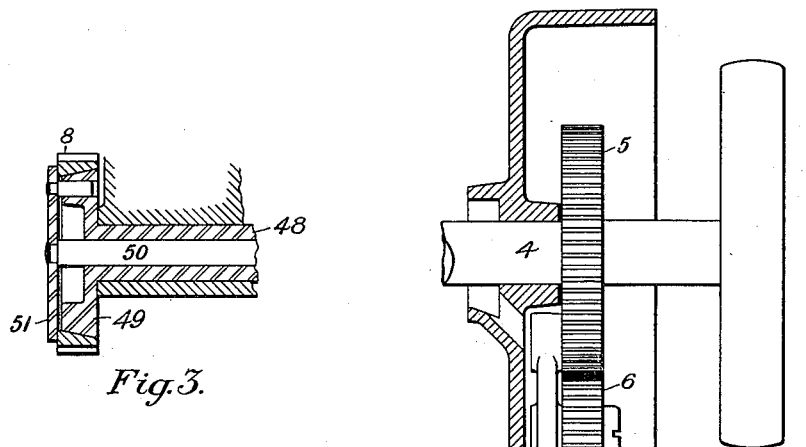
Figure 2:
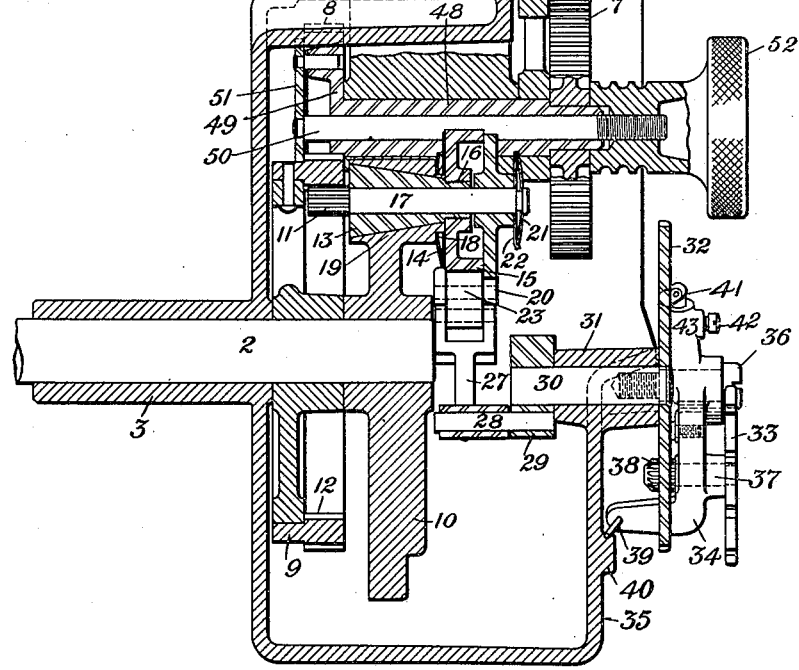
Figure 12:
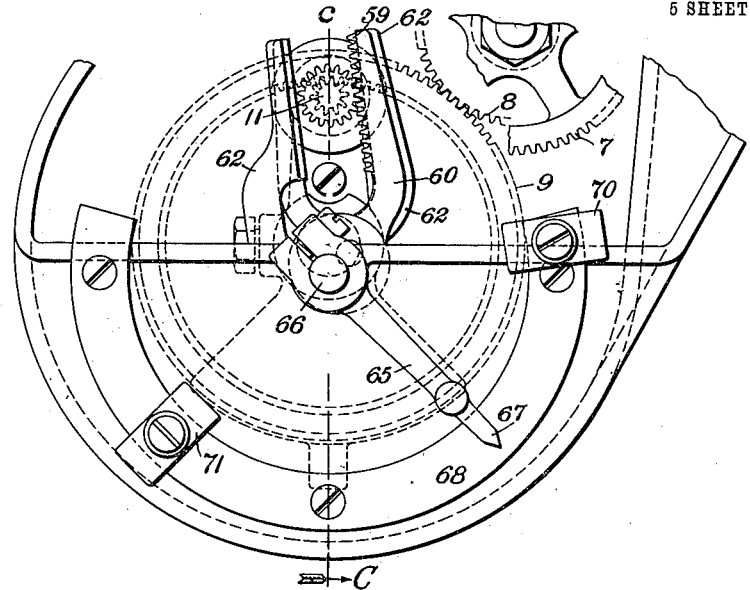
Figure 13:
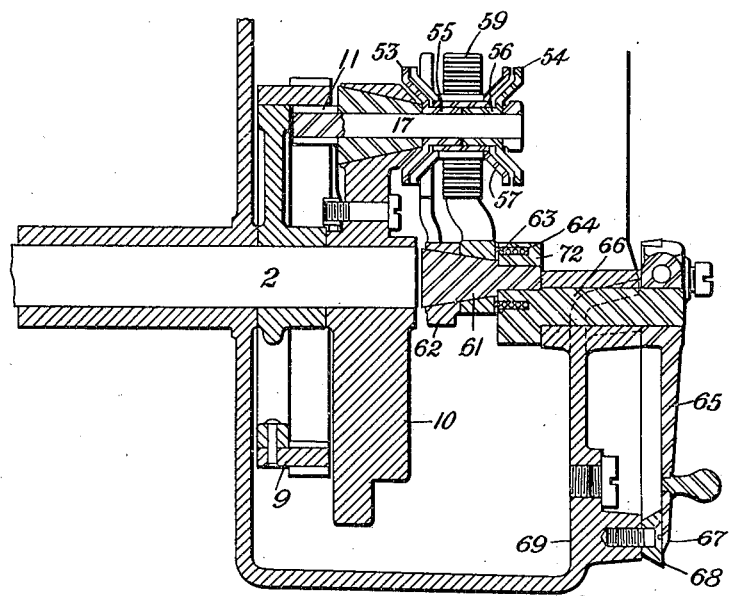

Of the accompanying drawings, forming part of this specification, Figure 1 is an elevation of one form of my invention. Fig. 2 is sectional side elevation on the line $a\ a$ of Fig. 1 looking in the direction of the arrow A. Fig. 3 is a detail of the gear 8, being also sectional of Fig. 1 on the line $b\ b$ looking in the direction of the arrow B. Figs. 4 and 5 show the adjusting means in extreme position. Figs. 6, 7, 8, and 9 are diagrammatic, indicating different phases in the cycle of movements of one revolution of the gain mechanism. Figs. 10 and 11 are details of the dial device for setting or adjusting the gain. Fig. 12 shows an elevation of another embodiment of my invention. Fig. 13 shows a section of same on the line $c\ c$ looking in the direction of the arrow C. Fig. 14 shows a detail.

Referring to Figs. 1 and 2, the shaft 2, rotatable in suitable bearings, one of which is represented by 3, is driven by suitable means—as, for example, from the shaft 4 through the gears 5, 6, 7, 8, and 9 and other instrumentalities hereinafter to be described. The gear 9 is of itself free to rotate on the shaft 2, but is rotatively connected therewith by the member 10, which is fast on the shaft 2. The active means for engaging the gear 9 with the member 10 is a pinion 11, which meshes with internal teeth 12 in the rim of the gear 9. The pinion 11 is restrained from rotation by friction devices, so devised and adjusted that rotation of the shaft 2 from the shaft 4 through the gear-train 5, 6, 7, 8, and 9 shall not cause rotation of said pinion; but devices are incorporated in the mechanism for positively rotating the pinion aforesaid for the purpose of modifying the rate of rotation transmitted by the gear 9 to the shaft 2.

The frictionizing means referred to are found in the taper sleeve 13, the spring 14, and the ratchet 15. The taper sleeve 13 carries the ratchet 15, which is screwed onto a reduced threaded portion 16 of the sleeve 13. It is held in its taper seat in the member 10 by spring 14 in such manner and degree as to resist ready rotation. The sleeve 13 is practically a part of the pinion-shaft 17, being secured thereto by any suitable means, preferably forced or shrunk on. The spring 14 acts between the shoulder 18 of the hub 19, in which the taper sleeve 13 has a bearing, and the face of the ratchet 15, thus tending to force the ratchet 15 outward away from the hub 19 and the sleeve 13 into or against its seat in the manner aforesaid. On the end of the pinion-shaft 17 is carried the pawl-arm 20, oscillatable on said shaft, but restrained from looseness by the spring 21, which bears on the washer 22 and holds the arm 20 in place on the shaft 17 and against the ratchet 15.

Referring to Figs. 1, 2, and 4, the pawl-arm 20 carries a pawl 23, which, fulcrumed on the pin 24, engages the teeth 26 of the ratchet 15. A stop-pin 25 limits the movement of the toe or teeth engaging extremity of the pawl, preventing a greater movement of the pawl on its arm than is necessary to remove its toe from engagement with the teeth 26 of the ratchet and insuring that any movement of the pawl greater than is necessary to perform this function will be imparted to the pawl-arm 20 and shift it to cause the pawl to make a new engagement with and move the ratchet 15. The pawl 23 is connected by a link or other connection 27 with an adjustable pin 28. Preferably it is the crank-pin 28 of the crank 29. (See Fig. 2.) This crank 29 is carried on a shaft 30, which is mounted eccentric to the shaft 2. Preferably the degree of this eccentricity is equal to the throw of the crank-pin 28, so that in one position the said crank-pin is concentric with the shaft 2, as in Fig. 4. Fig. 5 shows the crank-pin in its position of extreme eccentricity with reference to the shaft 2. When thus concentric with the shaft 2, the crank-pin 28 causes no action of the pawl 23, there is no movement of the pinion 11, and therefore the shaft 2 rotates at precisely the same speed as that of the gear 9; but if the crank-pin 28 is moved out of line with the shaft 2 then, if sufficiently eccentric, it causes an oscillation of the pawl-arm 20 and an action of the pawl 23 on the ratchet 15. This pawl action is a rotation of the ratchet 15 through a fraction of a turn, dependent on the extent of oscillation of the pawl-arm 20. In its rotation the ratchet 15 carries with it the attached pinion 11, which is thereby caused to travel on the gear 9, carrying with it the member 10 and the shaft 2 and causing them to have a different degree or extent of motion from that of the gear 9. In other words, if the total number of the gear-teeth 12 is one hundred and sixty and the extent of movement of the pinion 11, due to the action of the crank-pin 28 through the pawl 23, is such as to travel it one tooth then for each rotation of the gear 9 the member 10 will accomplish one one-hundred-and-sixtieth of a rotation, more or less, than the gear 9, depending on the specific arrangement and direction of motion of the parts. In this case the direction of rotation of the gear 9 is that of the arrow D, Fig. 6, and the direction of travel of the pinion 11 is that of the arrow E, so that for each full rotation of the gear 9 the shaft 2 will make only one hundred and fifty-nine one-hundred-and-sixtieths of a rotation, (still assuming that the internal teeth 12 number one hundred and sixty.)

Figure 6:
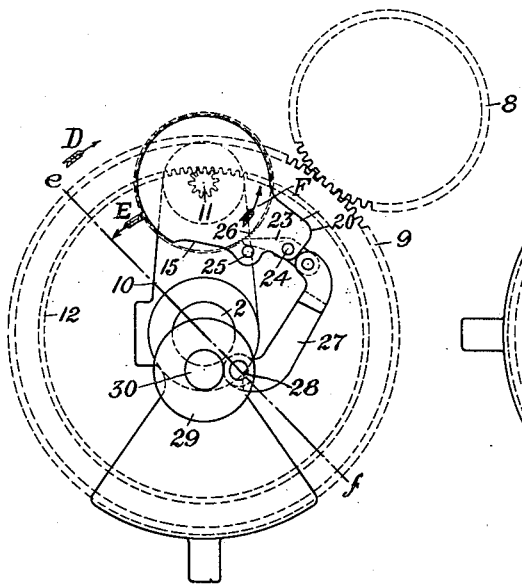
Figure 7:
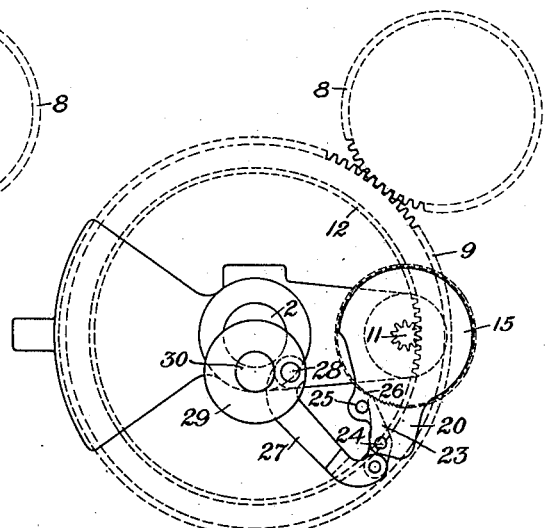

The action may be more clearly seen in Figs. 4, 5, 6, 7, 8, and 9. It is obvious that as the pinion 11 revolves about the shaft 2 it describes an orbit eccentric to the crank-pin 28 and that in this orbit the points of nearest approach to and farthest removal from the said crank-pin are those reached by the pinion when its axis is in line or in the same plane with the axis of the shaft 2 and the axis of the crank-pin 28—viz., at $e$ and $f$, Fig. 6; further, that as the pinion describes that portion of its orbit from $e$ to $f$ the pawl-arm 20 and the link 27 close toward each other scissor fashion. This is particularly shown in Figs. 6 and 7, Fig. 6 showing the relation of parts when the pinion 11 has left $e$, with the pawl-fulcrum 24 well within the lines indicating the teeth 12 and the pawl-arm 20 well away from the link 27, Fig. 7 showing the same parts as the pinion 11 approaches the point $f$, closing the pawl-arm toward the link 27 and pushing the pawl-fulcrum 24 radially outward to the line of the teeth 12. This motion first removes the toe of the pawl 23 from engagement with the ratchet-teeth 26, bringing it into contact with the stop-pin 25, and then moves both the pawl and its arm 20 back on the ratchet until the point $f$ of the pinion's orbit is reached. When the point $f$ is passed, the pinion 11 and the crank-pin 28 separate, causing the pawl-arm 20 and the link 27 to open scissor fashion. This causes a reverse movement of the pawl-arm 20. The first pull of the link 27 moves the pawl 23 into engagement with the ratchet and then moves the pawl and ratchet bodily, rotating the pinion 11 and causing it to travel back on the gear 12 to retard the movement of the shaft 2.

Figure 8:
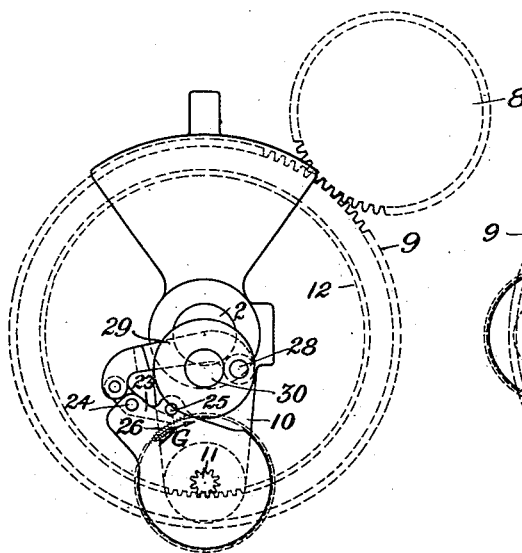
Figure 9:
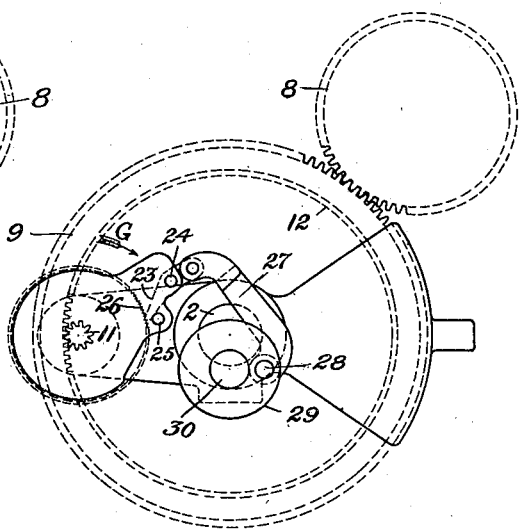

Fig. 8 shows the relation of the parts after the point $f$ has been passed by the pinion, and Fig. 9 their relation as the point $e$ is approached. In Figs. 4 and 5 the radial lines $g\ h$ and $g\ i$ represent the range of movement of the pawl 23 on the ratchet 15 and the arrows F and G the directions of movement of said pawl at different phases of the functional cycle.

Referring to Figs. 2 and 10, the crank-shaft 30 is in a bearing 31 and carries at its end a toothed dial-plate 32. Adjacent and in front of the plate 32 is a second dial-plate 33, carried on a lever 34, which is secured to the frame 35 of the device by the screw 36. The second dial-plate 33 is mounted on a shaft or spindle 37, having a pinion 38, which meshes with the teeth of the dial-plate 32 and is held in mesh by the spring 39, which, secured in the extremity of the lever 34, bears against the lug or projection 40 on the frame 35. The dial-plate 32 is graduated to indicate the requisite degree of adjustment for producing different relative speed ratios of the gear 9 and the shaft 2 between relatively wide ranges. The geared dial-plate 33 provides for fine adjustments. When an extreme change of adjustment must be secured, as from "0" to "5" on the dial 32, the spring 39 can be removed from the lug 40, thus releasing the pinion 38 from engagement with the dial-plate 32. The latter can then be turned to the desired point, (marked 5.) Then the dial 33 can be reëngaged through its pinion 37 by replacing the spring 39 on the lug 40, and any desired refinement of adjustment can be secured. The index or reference—zero-mark—for the dial 32 is carried on the adjustable finger 41, which is secured by the set-screw 42 in the arm 43 of the lever 34. By this adjustable feature the reference-zero can be established readily for each machine without that elaboration which would be required to compensate for cumulative variations, which would affect a fixed non-adjustable point. The dial-plate 33 is indexed from a spring-latch 44, which is secured by the screw 45 to the back of the lever 34, protrudes through the opening 46, and engages index-notches 47 in the rim of the dial-plate 33, as is indicated in Fig. 10, but more clearly in the detail Fig. 11, which is sectional of Fig. 10 on line $d\ d$.

Under certain conditions it is desirable to disconnect the shaft 2 from the shaft 4 and its train of gearing. Provision is made for this at the gears 7 and 8, which are carried on the shaft 48. The latter is hollow, with a tapered head 49, Fig. 3, on which the gear 8 can turn. Through the hollow of the shaft 48 extends a rod 50, having at one end a head or plate 51, that bears on the gear 8, and the other end is threaded to receive a handle 52, that bears on the gear 7. The externally-tapered head 49 and internally-tapered seat for same in the gear 8 constitute a clutch. By tightening the handle 52 the plate 51 engages the gear 8 with the head 49, so that motion is transmitted from the shaft 4 to the shaft 2. By loosening the handle aforesaid the two shafts are disconnected.

Figs. 12 and 13 show a modified structure. As in the embodiment above described, there is a shaft 2 and a gear 9, freely rotatable on the shaft, a pinion 11, and member 10 to carry the pinion, with friction devices to lock the member 10 with the gear 9 through the pinion 11; but the ratchet for operating the pinion is of different structure. On the pinion-shaft 17 are two ratchet-clutches 53 and 54, having oppositely-inclined teeth, as is more clearly shown in Fig. 14, each shaped like a half-spool. Mounted on their abutting barrels 55 and 56 is a spool-shaped ratchet-clutch 57, so short as to be engageable with only one of the clutches 53 or 54 at the same time and slidable on the barrels 55 and 56 to engage either. The barrel 58 of the clutch 57 is formed with gear-teeth which are engaged by corresponding teeth 59 of the forked member 60. The forked member 60 is carried on a crank-pin 61, which corresponds with the crank-pin 28 and, like it, is adjustable with relation to the shaft 2 and the orbit of the pinion 11. The revolution of the pinion 11 about the shaft 2 causes, when the crank-pin 61 is eccentric to said shaft 2, travel of the forked member 60 on the barrel 58 of the clutch 57. Rotation of said clutch 57 in one direction causes disengagement of its teeth with those of the engaging clutch member 53 or 54, and reverse rotation causes reengagement and consequent rotation of the pinion 11, with its consequent effect on the speed relation of the gear 9 and shaft 2.

Particularly novel means are employed to engage the clutch members. Adjacent the toothed forked member is a second forked member 62, each arm or branch of which is adjacent one of the heads of the spool-shaped clutch 57. The heads of this clutch are tapered, and the arms of the forked member 62 are beveled to match the taper of said heads. The forked member 62 is frictionally mounted on the crank-pin 61, which is tapered, and the hub of the forked member 62 is forced against said taper by the spring 63 in an annular recess 64 of the crank 72. As the clutch members are revolved about the axis of the shaft 2 the tapered head of the clutch 57 is pressed against a beveled arm of the forked member 62, thereby engaging the clutch 57 with the clutch 53, as indicated in Fig. 14. Were the direction of revolution of the pinion 11 around the shaft 2 reversed, then engagement would be had with the other arm of the member 62 and with the clutch member 54.

Adjustment of the eccentricity of the crank-pin is secured by the arm 65, secured to the crank-shaft 66. This arm is formed with a pointer 67, which moves over an arcal piece 68, secured to the frame 69. This may be graduated as desired. As shown in Fig. 12, it is provided with stops 70 and 71 to limit the range of movement of the pointer.

As intimated hereinbefore, the device hereinbefore described is used in the winding of V or universal wound packages, and its function is to control the gain. The shaft 4 represents the winding-spindle of a winding-machine, and the train of gears 5, 6, 7, 8, and 9 determine the number of winds—i. e., the nominal number of coils or turns or fractions of a turn in which the material wound is deposited between the ends of the package. The mechanism particularly described and which embodies my invention slightly modifies the normal speed ratio between the shaft 4 and the shaft 2 to lay adjacent turns or coils closely side by side without piling and with no undue space between them.

It being obvious from the foregoing that my invention is susceptible of various treatments, forms of embodiment, and modes of application, I do not limit myself to the precise forms and arrangements of structure hereinbefore described; but

I claim—

1. In a speed-controlling device, the combination with a shaft, a gear rotatable on the shaft and a pinion intermediate the shaft and the gear, of a ratchet connected with the pinion and means to operate the ratchet to travel the pinion on the gear.

2. In a speed-controlling device, the combination with a shaft, a gear rotatable on the shaft, and a pinion intermediate the shaft and the gear, of a ratchet connected with the pinion and adjustable means to operate the ratchet, to travel the pinion on the gear.

3. In a speed-controlling device, the combination with a shaft and a gear rotatable on the shaft, of a pinion carried by the shaft, means to prevent rotation of said pinion by the gear, and means to positively rotate the pinion to travel it on said gear.

4. In a speed-controlling device, the combination with a shaft and a gear rotatable on the shaft, of a pinion carried by the shaft, friction means to prevent rotation of said pinion by the gear, and means to positively rotate the pinion to travel it on said gear.

5. In a speed-controlling device, the combination with the shaft 2 and the gear 9 rotatable thereon, of a pinion 11, a tapered member 13 therewith connected, a hub 19, a spring 14 to frictionize the member 13 in the hub, and means to rotate the pinion.

6. The combination with a shaft 2, gear 9 rotatable thereon, and a pinion 11 carried by the shaft and travelable on said gear, of a ratchet 15 connected with the pinion, a pawl 23 to actuate the ratchet, a pin 28 eccentric to the shaft 2, and a link 27 connecting the pawl and the pin.

7. The combination with a shaft 2, gear 9 rotatable thereon, and a pinion 11 carried by the shaft and travelable on said gear, of a ratchet 15 connected with the pinion, a pawl 23 to actuate the ratchet, a pin 28 eccentric, and adjustable with relation to the shaft 2, and a link 27 connecting the pawl and the pin.

8. The combination with the shaft 2, member 10 secured to the shaft and pinion 11 rotatable in said member, of a ratchet 15 with its pawl 23 carried by the member 10, a pin 28 eccentric to the axis of the shaft, and a link 27 connecting the pin and the pawl for the purpose specified.

9. The combination with the shaft 4, the shaft 2, driving means connecting the two, including the gear 9 rotatable on the shaft 2 and the gear 8, of clutch means for disconnecting the gears 8 and 9 from the other driving means, and means for modifying the rotative relation of the shaft 2 to the gear 9.

10. The combination with a shaft 2, a gear 9 rotatable on the shaft, and a pinion travelable on said gear, of a tapered sleeve 13 secured to the pinion, and a ratchet secured to the sleeve, a shaft 17 for the pinion, extending through and projecting beyond said sleeve, an arm 20 mounted on said pinion-shaft, and a pawl 23 on the arm, a pin 28 eccentric to the shaft 2, and a link 27 connecting the pawl and the pin.

11. The combination with a shaft 2, a gear 9 rotatable thereon and a pinion travelable on the gear to modify the rotative relation of the shaft to the gear, of a ratchet and pawl to travel the pinion, a pin eccentric to the shaft 2, a connection 27 between the pawl and the pin, a crank 29 carrying the pin, and means to lock the crank 29 in different rotative positions.

12. The combination with a shaft 2, a gear 9 rotatable on the shaft and a pinion travelable on the gear to vary the rotative relation of the shaft to the gear, of a ratchet and pawl to travel the pinion, a pin adjustably eccentric to the shaft 2, a connection 27 between the pawl and the pin, a crank 29 carrying the pin, and means to lock the crank in different rotative positions, said means including an index-plate to indicate the position of the crank.

13. The combination with a shaft 2, a gear 9 rotatable on the shaft, and a pinion 11 travelable on the gear to vary the rotative relation of the shaft to the gear, of means to travel the pinion, means to adjust the rate of travel, and devices to lock said adjusting means including an index-plate to indicate one degree of adjustment, and a supplemental index-plate to indicate adjustments of a finer degree.

14. The combination with a shaft 2, a gear 9 rotatable on the shaft, and a pinion 11 travelable on the gear to vary the rotative relation of the shaft to the gear, of means to travel the pinion, means to adjust the rate of travel, and means to lock said adjusting means including an index-plate directly connected with the adjusting means, and a supplemental index-plate geared to the first.

15. The combination with a shaft 2, a gear 9 rotatable on the shaft, and a pinion 11 travelable on the gear to vary the rotative relation of the shaft to the gear, of means to travel the pinion, means to adjust the rate of travel, and means to lock said adjusting means comprising a geared index-plate directly connected with the adjusting means, a supplemental index-plate geared to the first, and means to hold the supplemental index-plate in engagement with the first and permit its disengagement.

16. The combination with a shaft, a gear rotating thereon, a pinion travelable on the gear, and means to travel the pinion, of an adjustable crank 29 to vary the rate of travel, and means to lock the crank in its adjusted position comprising a geared index-plate 32 to register the degree of adjustment, a pinion 38 engaging the geared index-plate, a supplemental index-plate 33 connected with the pinion, and a spring-latch 44 to lock the index devices in any adjustment to which they may be set.

17. The combination with a shaft, of a toothed driving-gear rotatable in respect thereto, a pinion supported to be carried with the shaft and engaging the gear, and automatic means for intermittently rotating said pinion.

18. The combination with a shaft, of a toothed driving-gear rotatable in respect thereto, a pinion supported to be carried with the shaft and engaging the gear, means for rotating said pinion, and adjustable means whereby to retain said pinion non-rotating and for also imparting different degrees of rotation thereto.

In testimony whereof I affix my signature in presence of two witnesses.

SIMON W. WARDWELL.

Witnesses:
   CHAS. A. EDDY,
   THOS. M. CHILDS.